US006947812B2

(12) United States Patent
Kress et al.

(10) Patent No.: US 6,947,812 B2
(45) Date of Patent: Sep. 20, 2005

(54) COMPUTER-ASSISTED SUPPORT METHOD FOR PROJECTING AN ELECTRIC LINE SYSTEM

(75) Inventors: Toni Kress, Lauf (DE); Andre Turnaus, Nürnberg (DE); Dieter Walter, Hessdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/472,043

(22) PCT Filed: Mar. 7, 2002

(86) PCT No.: PCT/DE02/00819

§ 371 (c)(1), (2), (4) Date: Mar. 16, 2004

(87) PCT Pub. No.: WO02/075881

PCT Pub. Date: Sep. 26, 2002

(65) Prior Publication Data

US 2004/0143371 A1 Jul. 22, 2004

(30) Foreign Application Priority Data

Mar. 20, 2001 (DE) ........................................ 101 13 565

(51) Int. Cl.[7] ................................................ G05D 11/00
(52) U.S. Cl. ........................................ 700/286; 700/295
(58) Field of Search ......................... 700/286, 293–295; 709/223–226

(56) References Cited

U.S. PATENT DOCUMENTS

| | | | |
|---|---|---|---|
| 5,586,254 A | * 12/1996 | Kondo et al. | 714/25 |
| 5,798,939 A | * 8/1998 | Ochoa et al. | 700/286 |
| 6,181,984 B1 | 1/2001 | Sawa et al. | 700/286 |

* cited by examiner

*Primary Examiner*—Albert W. Paladini
*Assistant Examiner*—Zoila Cabrera
(74) *Attorney, Agent, or Firm*—Harness, Dickey & Pierce, P.L.C.

(57) ABSTRACT

The topology of a bus or network electric line system which is used to provide a plurality of electric consumers with low voltage from a feed block, is inputted into a computer. For several feed points, a measuring value is determined for the electric line system on the basis of at least one technical criterium and is transmitted to a user as a function of the feed point. It is assumed that the feed block is connected to the electric line system at the respective feed point.

31 Claims, 4 Drawing Sheets

COMPUTER-ASSISTED SUPPORT METHOD FOR PROJECTING AN ELECTRIC LINE SYSTEM

This application is the national phase under 35 U.S.C. § 371 of PCT International Application No. PCT/DE02/00819 which has an International filing date of Mar. 7, 2002, which designated the United States of America and which claims priority on German Patent Application number DE 101 13 565.3 filed Mar. 20, 2001, the entire contents of which are hereby incorporated herein by reference.

FIELD OF THE INVENTION

The present invention generally relates to computer-aided method for configuration of a cable system, via which at least two electrical loads are intended to be capable of being supplied with low voltage from at least one supply module. Preferably, topology of the cable system is entered in a computer; the cable system has a single section, corresponding to the topology, per load, via which only this load is intended to be capable of being supplied with electrical power; and the cable system has connecting sections, corresponding to the topology, via which the single sections are intended to be connected to one another and via which it is intended to be possible to supply in each case at least two of the loads with electrical power.

BACKGROUND OF THE INVENTION

In the industrial systems, in particular machines and machine systems, a large number of electrical low-voltage loads must be supplied with electrical power. The loads are often, but not necessarily, single-phase or three-phase AC voltage motors. A 500 V DC voltage, for example, supply is also known.

In the past, power was distributed to the loads in switchgear cabinets in which the feed module for the loads was also arranged. Separate cables were routed from the switchgear cabinet to the individual loads. A cable system thus had a star-like topology. On the basis of this topology, namely with a separate cable for each load, it was relatively simple to design the cables. This work could be done even by electricians using comparatively simple tables.

Recently, the electrical loads have been connected to an ever greater extent to the feed module via cable systems similar to busses or networks. A bus section of the cable system thus originates from the feed module, via which a network—which possibly may even have further branches—is passed to the individual loads. The bus section carries all the current for the connected loads. Further sections branch off to the individual loads, and these are referred to in the following text as single or end sections, which carry the current for only this single load.

The PCT application "Computer-aided test procedure for a cable system" (internal file reference 2000 P 03188 WO, priority date Mar. 20, 2000, priority file reference 100 13 521.8), which was submitted on the same date as the present application, describes a test procedure for a bus-like or network-like cable system, by which it is possible to check that the design of the cable system is adequate, and by which this cable system may even possibly be designed automatically. However, the topology of the cable system as such is not changed.

In the method described above, it is possible for the feed module to be arranged poorly by the user. This leads to disadvantages during operation of the cable system and, in the extreme, even to the possibility of the cable system no longer being adequately designed or no longer being correctly configurable.

SUMMARY OF THE INVENTION

An object of an embodiment of the present invention is to specify a method by which the topology of a cable system can also be assessed.

An object may be achieved.

- in that the computer determines a number of feed points at which the feed module is intended to be connected to the cable system,
- in that the computer determines a value measure for the cable system for each feed point on the basis of at least one technical criterion, and/or
- in that the value measure is output to a user as a function of the feed point.

This is because it is simple for the user to see where good feed points for the connection of the feed module are located.

If the cable system is represented graphically by the computer by an output device, the value measures are likewise output by the computer by way of the output device, and the respective value measures are associated in terms of their positions with the corresponding feed points in the output, the user can see good feed points particularly easily.

The choice of a particularly good feed point is especially simple if the computer determines an optimum value measure and the optimum value measure is emphasized visually in the output.

A final feed point is defined once the value measure has been output as a function of the feed point. The final feed point may in this case either be defined automatically by the computer or else may be predetermined by the user for the computer. In the latter case, the predetermination process is particularly convenient if the computer proposes to the user one of the feed points as a final feed point, and the computer adopts this feed point as the final feed point if the user enters a confirmation for it.

The sections of the cable system may, for example, be designed on the basis of at least one design criterion, with the value measure being determined on the basis of the design.

If the value measure is determined on the basis of the sum of the section lengths weighted by the cross section of the cable cores in the sections, this results in the minimum use of materials when choosing an optimum or virtually optimum feed point. However, other technical criteria are also feasible. For example, the value measure may become greater the less the maximum voltage drop or the more uniform the current distribution.

If the cross sections of the cable cores are limited to a maximum cross section, and feed points are marked as not being permissible if the design criterion is not satisfied during connection of the feed module to these feed points, even for the maximum sizes of the sections, unacceptable feed points can be immediately identified as such in a simple manner.

If immediately adjacent feed points are separated from one another by one grid unit, which is predetermined by the user for the computer before determining the value measures, the accuracy for determining the value measures can be defined in advance.

If the grid size is an integer multiple of a basic grid and the final feed point is located on the basic grid, this ensures that the final feed point can be located on one of the feed points.

Good feed points can be found even more reliably if at least one feed point is arranged in each connecting section, independently of the grid size.

If at most a predetermined number of feed points are arranged in each connecting section independently of the grid size, the required computation time is kept within limits, despite the sections possibly being long.

If the user predetermines for the computer the part of the cable system in which the feed points are intended to be arranged, it is possible, for example in a first step, to predetermine a relatively coarse grid size and then to select the area in which the value measure assumes high values, and finally to carry out a further value measure determination process using a finer grid size, and possibly even a considerably finer grid size.

If the user predetermines the technical criterion for the computer, the method operates in a particularly flexible manner.

If two cable systems are entered in the computer at the same time and have at least the feed module in common, and the computer determines a specific value measure for each of the cable system, the method can be used in a particularly versatile manner. This is because, in practice, there is generally at least one actual main cable system and two auxiliary cable systems, one of which can be switched (as a result of an emergency off function), and other cannot be switched.

Within the two auxiliary cable systems, it is possible for the cable systems also to have at least one common load. In the relationship between the main cable system and the auxiliary cable systems, situations often arise in which at least one of the loads on the main cable system is preceded by a switching and protection module, and the switching and protection module is a load on an auxiliary cable system.

The main cable system is generally operated with a single-phase AC voltage of, for example, 230 Volts, or a three-phase AC voltage of, for example, 400 Volts. The auxiliary cable systems are generally operated either with a DC voltage of, for example, 24 Volts or with a single-phase AC voltage of, for example, 230 Volts. These situations may, of course, possibly also be taken into account in the design of the cable systems and in the determination of the value measure.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
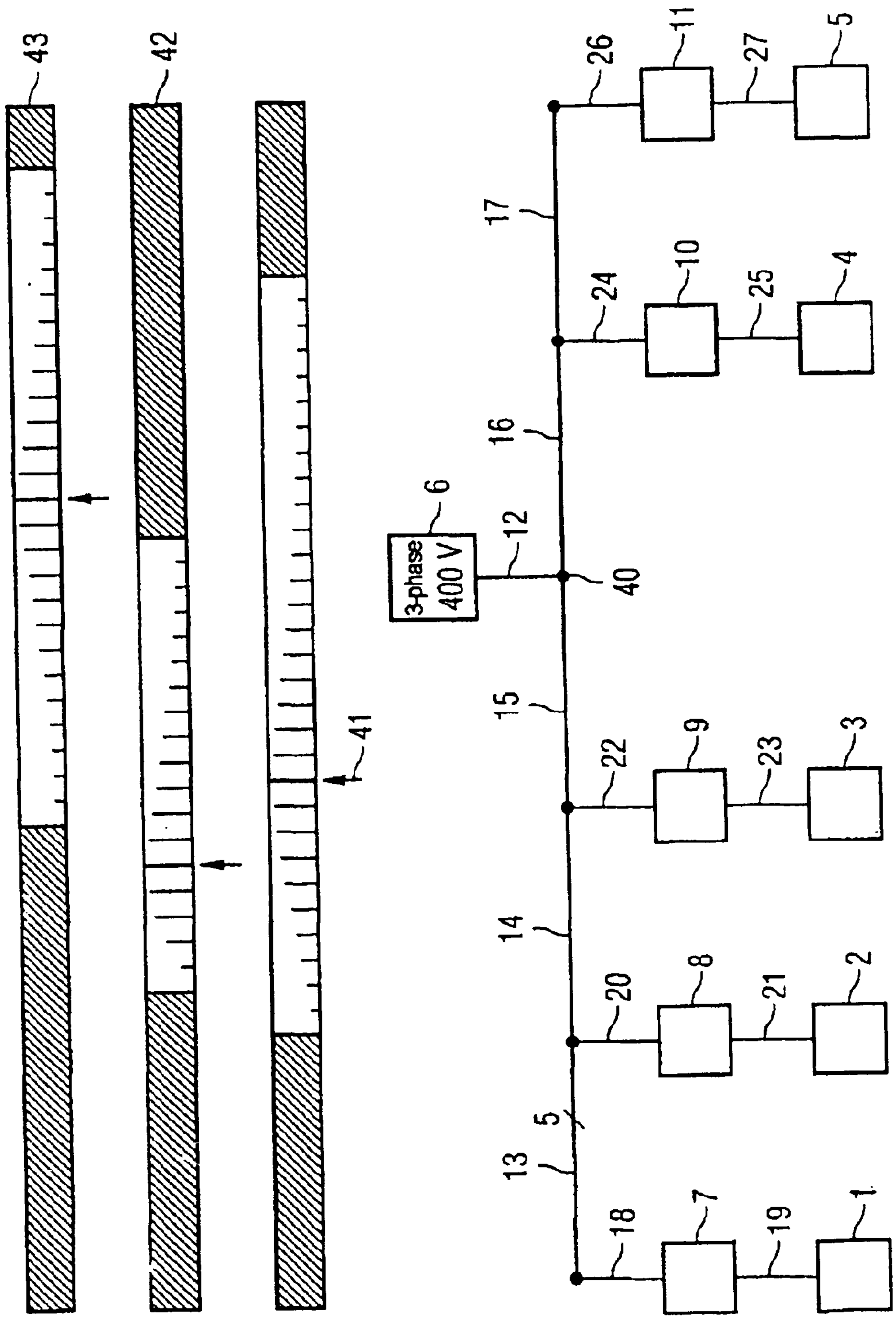
FIGS. 1 and 2 show examples of a circuit arrangement.

As is shown in FIG. 1 (by way of example) five main loads 1 to 5 are intended to be supplied with electrical power from at least one—and here this is precise—feed module 6. Each of the main loads 1 to 5 is preceded by a switching and protection module 7 to 11. The loads 1 to 5 are generally, but not necessarily, motors. The switching and protection modules 7 to 11 are generally in the form of a contactor, with a circuit breaker connected upstream of it.

A main cable system is provided in order to supply the main loads 1 to 5 with electrical power. The main loads 1 to 5 are fed with a main low voltage via this main cable system. The main low voltage is a voltage of less than 1 kV, for example a three-phase AC voltage with a rated voltage of, for example, 400 Volts. In this case, the main cable system typically has five cores (three phases, a neutral conductor and ground).

As is shown in FIG. 1, the main low-voltage system has a main bus section 12, main connecting sections 13 to 17 and main end sections 18 to 27. As can be seen, the switching and protection modules 7 to 11 are in this case arranged upstream of the main loads 1 to 5.

The switching and protection modules 7 to 11 are auxiliary loads, which are supplied with electrical power via auxiliary cable systems. As can be seen from FIG. 2, the auxiliary cable systems have the same basic structure as the main cable system. All that should be noted in addition is that the switching and protection module 7 is not supplied with electrical power via these two auxiliary cable systems, but in some other way. Furthermore—so to speak by way of replacement—other components 28, 29 which are not included in the main cable system are connected to one or both of the auxiliary cable systems. The other components 28, 29 may, for example, be actuators or sensors. The auxiliary loads 8 to 11, 28, 29 may also be connected to one or to both of the auxiliary cable systems.

The auxiliary cable systems generally carry a lower voltage than the main cable system. Typical voltage values are single-phase AC voltage of, for example, 230 Volts, or a DC voltage of, for example, 24 Volts. In both cases, the auxiliary cable systems may have two cores.

Figure 2:
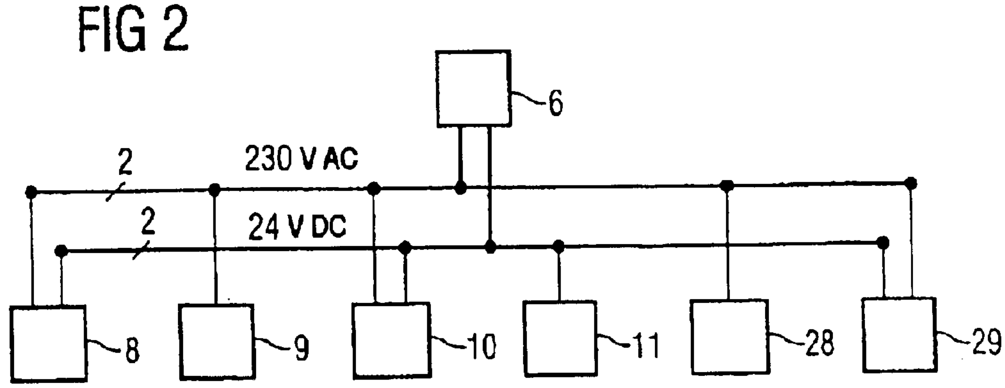

The cable systems thus have a common feed module 6. Furthermore, the auxiliary cable systems have common loads 8, 10, 29, as shown in FIG. 2. The loads 8 to 11 on the auxiliary cable systems are also switching and protection modules 8 to 11 in the main cable system, as is illustrated in FIG. 1.

Figure 3:
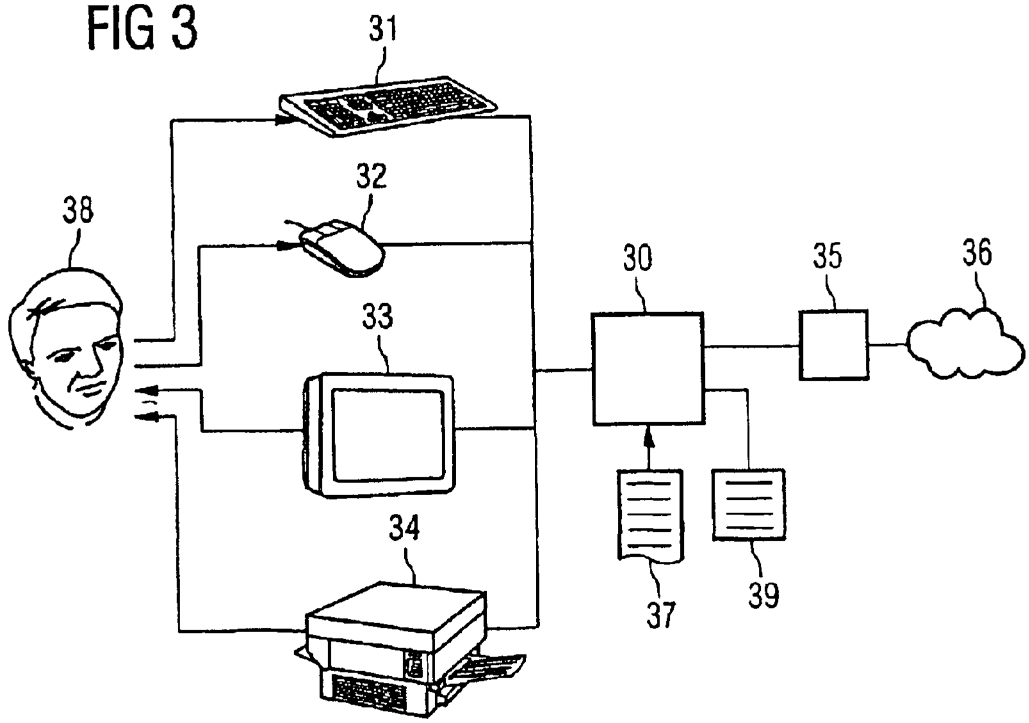
FIG. 3 shows a computer layout.

The method according to an embodiment of the invention (configuration tool 37) runs under program control of a computer, for example a PC. As is shown in FIG. 3, this computer has the normal components. These are a computer core 30, input devices 31, 32 (typically a keyboard 31 and a mouse 32), output devices 33, 34 (typically a monitor 33 and a primer 34) and, possibly, an interface 35 to a computer network 36, for example to the Internet.

When a program 37 is run, which includes the method according to an embodiment of the invention, the computer communicates with a user 38. In this case, it accesses, inter alia, a file 39 which, for example, is an ASCII file. This contains a topology for the cable systems and specifications for the sections 12 to 27 of the cable systems, as well as specifications for the elements 1 to 11, 28, 29 and can be both read from and written to.

The method according to an embodiment of the invention will be described in the following text in conjunction with FIGS. 4 and 5 on the basis of the main cable system. However, it can also be used analogously for the auxiliary cable systems.

Figure 4:
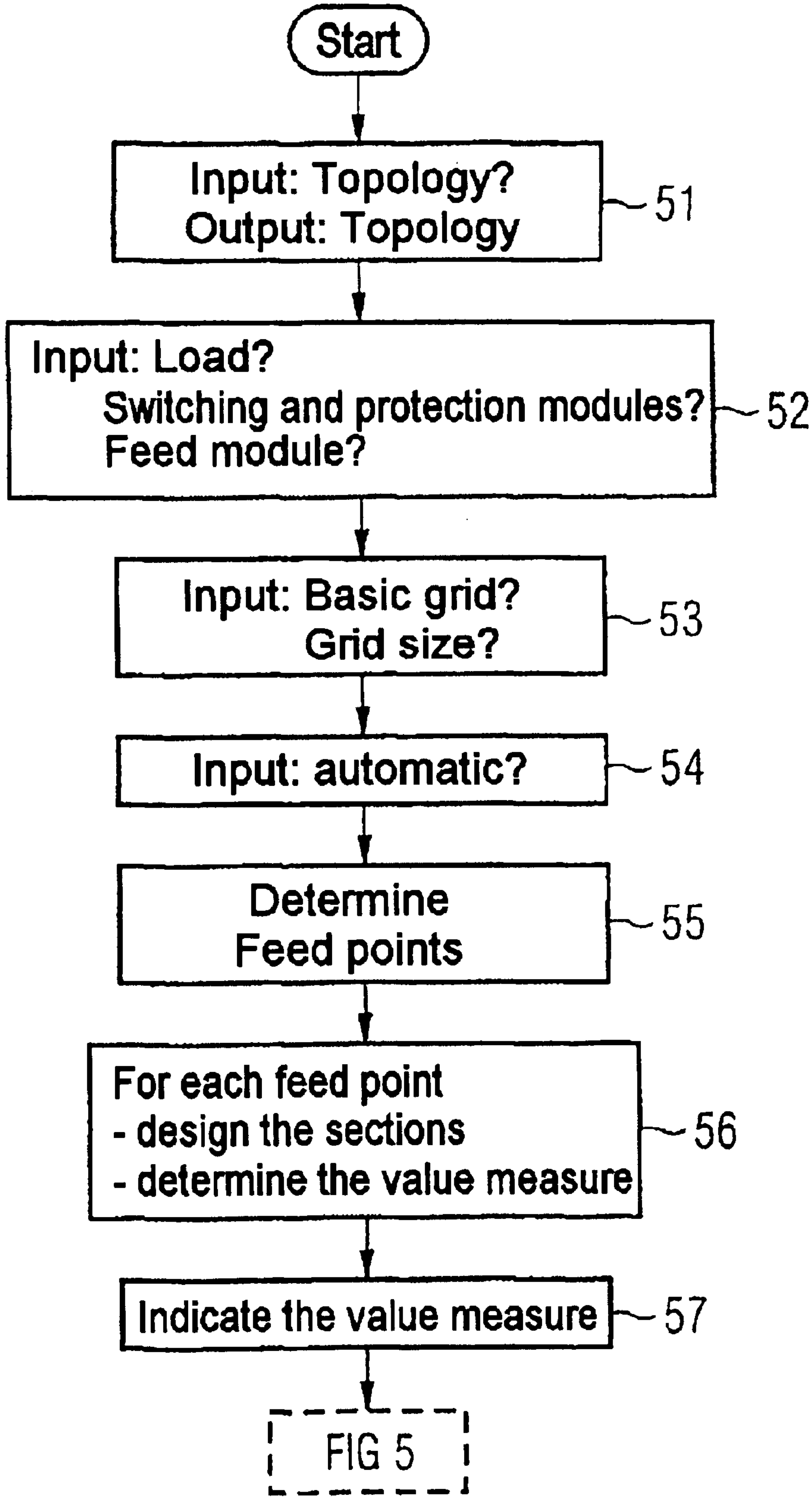
FIGS. 4 and 5 show a flowchart.

As is shown in FIG. 4, during the running of the program 37, topologies of the cable systems are first of all entered in a step 51 and are displayed graphically on the monitor 33—possibly individually, in different windows or superimposed. The loads 1 to 5, the switching and protection modules 7 to 11 and the further loads 28, 29 are then specified in a step 52. The feed module 6 is also specified in the step 52. The main and auxiliary loads 1 to 5, 7 to 11, 28, 29 and the feed module 6 are predetermined, and this implicitly defines the operating voltages with which the cable systems are intended to be operated in practice, that is to say the voltages with which they can be assumed to be operated for the purposes of the method.

A basic grid and a grid size are then entered interactively in a step 53. The grid size must in this case be an integer multiple of the basic grid. Finally, a step 54 interactively asks whether the computer will define a final feed point 40 automatically.

The computer now determines feed points 40 in accordance with a step 55. Immediately adjacent feed points 40 are in this case generally separated from one another by one grid unit. However, if it were to be found on the basis of the grid size that no single feed point 40 were arranged in one of the connecting sections 13 to 17, a feed point 40 would exceptionally also be arranged in this section, with less than one grid unit spacing. Furthermore, there are not less than a predetermined number (for example ten) of feed points 40 in each connecting section 13 to 17.

In a step 56, the computer now determines a value measure for the cable system for each of the feed points 40, on the basis of a technical criterion. This is based on the assumption that the feed module 6 is in each case connected to the cable system at the respective feed point 40. During this process—and this is described in detail in the patent application mentioned above entitled "Computer-aided test procedure for a cable system"—the sections 12 to 27 of the cable system are first of all designed on the basis of at least one design criterion. The sum of the section lengths, weighted by the cross section of the cable cores in the sections 12 to 27, is then likewise determined, also in step 56. The value measure is then determined on the basis of this sum. For example, the value measure may be equal to the reciprocal of the sum. The value measure in the present case is thus determined on the basis of the design.

The determined value measures are likewise output via the monitor 33 from the computer in a step 57. In this case, they are output in addition to the display of the topology of the cable system. In the present case, the value measures shown in FIG. 1 are indicated directly above the respective feed points 40, in the form of vertical bars. The bar lengths are proportional to the value measure. The value measure is thus output to the user 38 of the configuration tool 37 as a function of the feed point 40. The respective value measures are in this case associated, in terms of their positions, with the corresponding feed points 40 in the output.

The value measures have different values. The computer therefore compares the value measures in order to determine the largest or optimum value measure. This value measure is emphasized visually in the output. As is shown in FIG. 1, this is done by overlaying an arrow 41. However, other displays would also be feasible, for example by means of a colored marking or by blinking.

In the method proposed in the patent application mentioned above entitled "Computer-aided test procedure for a cable system", the cross sections of the cable cores are limited to a maximum cross section. When the feed module 6 is connected to some feed points 40, it is thus possible that the design criterion or the design criteria may not be satisfied even if the cable cores in the sections 12 to 27 are of the maximum size. If the aim is to comply with the design criterion or with the design criteria, feed points 40 such as these are not permissible. These feed points 40 are thus allocated to the value measure 0, and these areas are marked on the output of the value measures as not being permissible. This may be done, for example, by shading as shown in FIG. 1. Alternatively, for example, it would be possible to omit them completely or to mark them in a fault color, typically red.

Figure 5:
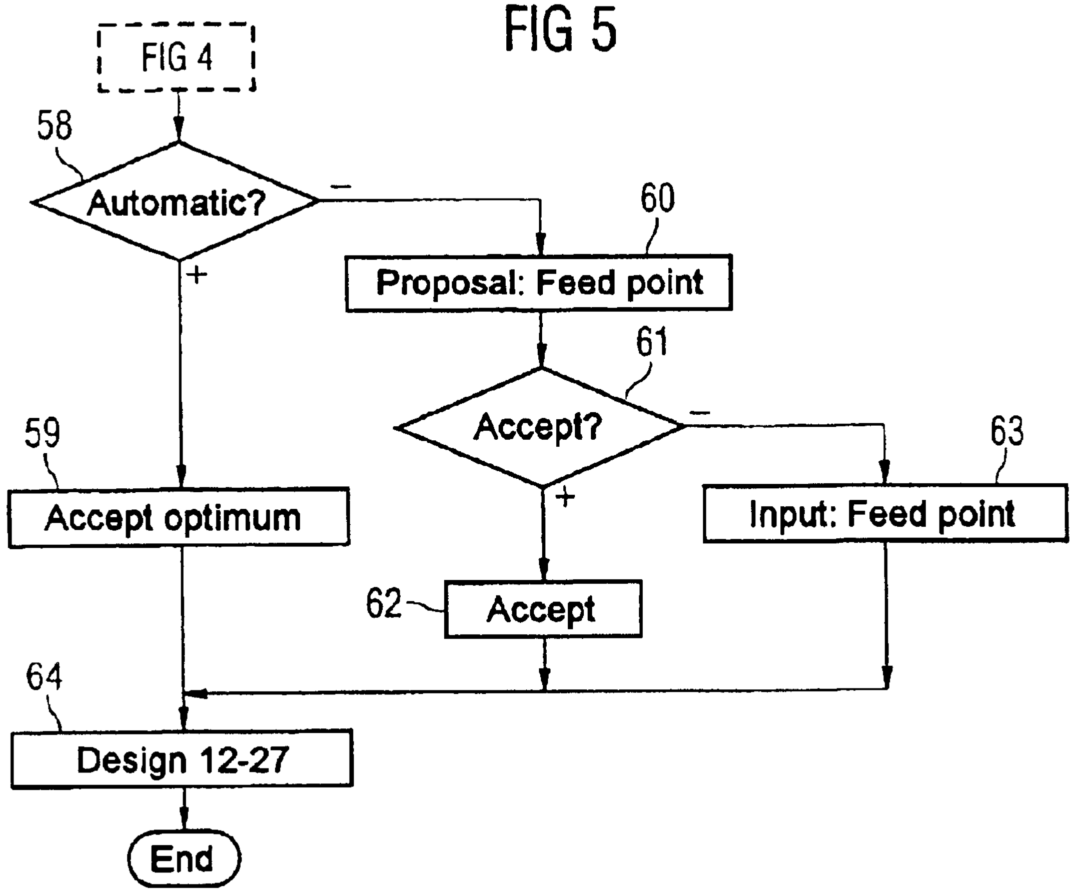

As is shown in FIG. 5, a step 58 now asks whether the user 38 wished in step 54 for the computer to automatically define the final feed point. If yes, in a step 59, the computer accepts the feed point 40 which has achieved the optimum value measures as the final feed point 40. Otherwise, the final feed point 40 is proposed by the user 38 to the computer. To do this, the computer first of all, in a step 60, proposes one of the feed points 40 to the user 38, preferably the feed point 40 which has already been determined to be the optimum feed point 40, as the final feed point 40. A question is then asked in a step 61 as to whether the user 38 has or has not confirmed this proposal. If the user 38 has confirmed the proposal, the proposal is accepted in a step 62. Otherwise, in a step 63, the user 38 asks for a position for the final feed point 40. The final feed point 40 must in this case lie on the basic grid.

Once the final feed point 40 has been defined, a step 64 is carried out. In this step 64, the sections of the cable system are designed once again on the basis of the design criterion. The procedure is the same as that before in step 56. The topology determined in this way and its design can then, for example, by printed out on the printer 34, or stored in the file 39.

Figure 6:
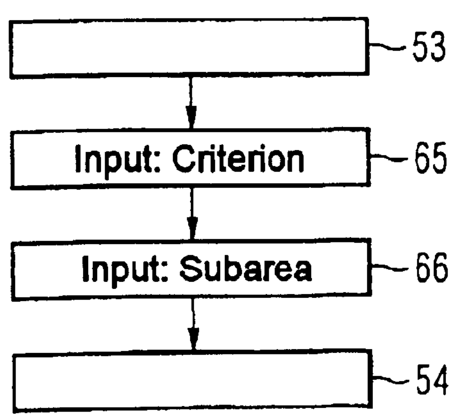
FIG. 6 shows a modification of FIG. 4.

FIG. 6 now shows a modification of the method shown in FIGS. 4 and 5. As is shown in FIG. 6, steps 65 and 66 are inserted between the steps 53 and 54. In the step 65, the computer asks the user 38 for a technical criterion on the basis of which the value measure will be determined and, if required, the final feed point 40 will later be defined. In the step 66, it is possible to enter the part of the cable system in which the feed points 40 are intended to be arranged. This allows the user 38 to limit the computation complexity from the start.

The method described above in conjunction with the main cable system may be carried out in an analogous manner—with appropriately adapted technical and design criteria—for the auxiliary cable systems as well. The value measures for the auxiliary cable systems are also preferably overload on the display of the main cable system and its value measure. This is symbolized by further bars 42, 43 in FIG. 1. The joint overlying of all the value measures is in this case particularly worthwhile because the cable systems may have different loads 1 to 5, 7 to 11, 28, 29 to one another, and may thus have different load structures. In particular, those areas in which the feed point 40 may not be arranged may differ considerably from one another.

However, if all the value measures are displayed at the same time it is easily possible to locate the final feed point 40 such that a permissible design can be achieved for all the cable systems.

What is claimed is:

1. A computer-aided method for configuration of a cable system, via which at least two electrical loads capable of being supplied with low voltage from at least one feed module, wherein a topology of the cable system is entered into a computer, wherein the cable system includes a single section corresponding to the topology, for each load, via which only each load is capable of being supplied with electrical power, and wherein the cable system includes connecting sections corresponding to the topology, via which the single sections are connectable to one another and via which it is possible to supply at least two of the loads with electrical power, the method comprising:

determining a number of feed points at which the feed module is connectable to the cable system, determining a value measure for the cable system for each feed point on the basis of at least one technical criterion; and outputting the value measure, as a function of the feed point, to a user.

2. The method as claimed in claim 1, wherein the cable system is graphically representable by the computer via an output device wherein the value measures are output from the computer via the output device, and wherein the respective value measures are associated in terms of their positions with the corresponding feed points in the output.

3. The method as claimed in claim 2, wherein the computer determines an optimum value measure, and wherein the optimum value measure is visually emphasized in the output.

4. The method as claimed in claim 1, wherein the computer determines an optimum value measure, and wherein the optimum value measure is visually emphasized in the output.

5. The method as claimed in claim 1, wherein, once the value measure has been output as a function of the feed point a final feed point is defined.

6. The method as claimed in claim 5, wherein the final feed point is defined automatically by the computer.

7. The method as claimed in claim 5, wherein the final feed point is predetermined by the user for the computer once the value measure has been output as a function of the feed point.

8. The method as claimed in claim 7, wherein the computer proposes to the user one of the feed points as the final feed point, and wherein the computer adopts this feed point as the final feed point if the user enters a confirmation.

9. The method as claimed in claim 1, wherein the sections of the cable system are designed on the basis of at least one design criterion, and wherein the value measure is determined on the basis of the design.

10. The method as claimed in claim 9, wherein the value measure is determined on the basis of the sum of the section lengths, weighted by the cross section of the cable cores in the sections.

11. The method as claimed in claim 10, wherein the cross sections of the cable cores are limited to a maximum cross section, and wherein the feed points are marked as not being permissible if the design criterion is not satisfied during connection of the feed module to these feed points, even for the maximum sizes of the sections.

12. The method as claimed in claim 9, wherein the cross sections of the cable cores are limited to a maximum cross section, and wherein the feed points are marked as not being permissible if the design criterion is not satisfied during connection of the feed module to these feed points even for the maximum sizes of the sections.

13. The method as claimed in claim 9, wherein, after defining the final feed point, the sections of the cable system are designed once again on the basis of the design criterion.

14. The method as claimed in claim 13, wherein, immediately adjacent feed points are separated from one another by one grid unit.

15. The method as claimed in claim 14, wherein a grid size is predetermined by the user for the computer before the value measures are determined.

16. The method as claimed in claim 15, wherein the grid size is an integer multiple of a basic grid, and wherein the final feed point lies on the basis grid.

17. The method as claimed in claim 14, wherein a grid size is an integer multiple of a basic grid, and wherein the final feed point lies on the basic grid.

18. The method as claimed in claim 17, wherein the basic grid is predetermined by the user for the computer.

19. The method as claimed in claim 14, wherein at least one feed point is arranged in each connecting section, independently of a grid size.

20. The method as claimed in claim 14, wherein, at most a predetermined number of feed points are arranged in each connecting section independently of a grid size.

21. The method as claimed in claim 1, wherein the user predetermines for the computer the part of the cable system, in which the feed points are intended to be arranged.

22. The method as claimed in claim 1, wherein the technical criterion is predetermined by the user for the computer.

23. The method as claimed in claim 1, wherein two cable systems are entered in the computer at the same time, wherein the cable systems have at least the feed module in common, and wherein the computer determines a specific value measure for each of the cable systems which is output to the user as a function of the feed point.

24. The method as claimed in claim 23, wherein at least one of the loads is also common to the cable systems.

25. The method as claimed in claim 23, wherein an upstream switching and protection module is entered in the computer for at least one of the loads in one cable system, and wherein the switching and protection module is a load on the other cable system.

26. The method as claimed in claim 23, wherein at least one of the cable systems is assumed to be operated with a DC voltage.

27. The method as claimed in claim 20, wherein at least one of the cable systems is assumed to be operated with a single-phase AC voltage.

28. The method as claimed in claim 23, wherein at least one of the cable systems is assumed to be operated with a three-phase AC voltage.

29. The method as claimed in claim 23, wherein at least one of the cable systems is assumed to be operated with a DC voltage of 24 V.

30. The method as claimed in claim 23, wherein at least one of the cable systems is assumed to be operated with a single-phase AC voltage of 230 V.

31. The method as claimed in claim 23, wherein at least one of the cable systems is assumed to be operated with a three-phase AC voltage of 400 V.

* * * * *